(12) United States Patent
Duffy et al.

(10) Patent No.: US 11,167,848 B2
(45) Date of Patent: Nov. 9, 2021

(54) UNMANNED AERIAL VEHICLE WITH ENHANCED CARGO STORAGE

(71) Applicant: The Boeing Company, Chicago, IL (US)

(72) Inventors: Michael James Duffy, Lansing, NY (US); Matthew S. Stauffer, Summerville, SC (US); Justin Fowler Rogers, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 816 days.

(21) Appl. No.: 15/933,928

(22) Filed: Mar. 23, 2018

(65) Prior Publication Data

US 2019/0291626 A1    Sep. 26, 2019

(51) Int. Cl.
| | |
|---|---|
| *B64C 1/22* | (2006.01) |
| *B64D 9/00* | (2006.01) |
| *B64C 39/02* | (2006.01) |
| *B64C 29/00* | (2006.01) |
| *B60P 7/00* | (2006.01) |
| *B60P 1/64* | (2006.01) |
| *B64F 1/32* | (2006.01) |
| *B65D 88/22* | (2006.01) |

(52) U.S. Cl.
CPC ............. *B64D 9/003* (2013.01); *B60P 1/649* (2013.01); *B60P 7/00* (2013.01); *B64C 1/22* (2013.01); *B64C 29/0025* (2013.01); *B64C 39/024* (2013.01); *B60P 1/6481* (2013.01); *B64C 2201/128* (2013.01); *B64F 1/32* (2013.01); *B65D 88/22* (2013.01)

(58) Field of Classification Search
CPC ......... B64C 1/20; B64C 1/22; B64C 2211/00; B64C 2211/128; B64D 25/12
See application file for complete search history.

(56) References Cited

U.S. PATENT DOCUMENTS

| | | | | |
|---|---|---|---|---|
| 2,388,380 | A * | 11/1945 | Bathurst | B64C 1/22 244/118.2 |
| 5,240,207 | A * | 8/1993 | Eiband | G05D 1/0038 244/190 |
| 2009/0184126 | A1* | 7/2009 | Glaser | B65D 88/14 220/562 |
| 2016/0081215 | A1* | 3/2016 | Boretti | H05K 7/1474 248/221.11 |

\* cited by examiner

*Primary Examiner* — Timothy D Collins
*Assistant Examiner* — Terri L Filosi
(74) *Attorney, Agent, or Firm* — Duft & Bornsen, PC (57) ABSTRACT

System and method for loading cargo onto an unmanned aerial vehicle (UAV). One embodiment is a cargo pod for an unmanned aerial vehicle (UAV). The cargo pod includes a hollow body that forms a section of a fuselage of the UAV, and further includes a latching mechanism that releasably secures the hollow body with the fuselage of the UAV.

20 Claims, 12 Drawing Sheets

UNMANNED AERIAL VEHICLE WITH ENHANCED CARGO STORAGE

FIELD

This disclosure relates to the field of unmanned aerial vehicles, and in particular, to unmanned aerial vehicles that carry cargo.

BACKGROUND

An unmanned aerial vehicle (UAV) is an aircraft that carries no human pilot or passengers. Some UAVs are equipped with a hatch that opens and closes for the loading of cargo onto the UAV. One type of UAV that is particularly useful for carrying cargo is a vertical takeoff and landing (VTOL) aircraft. A common configuration of VTOL aircraft is one having fixed wings with rotors mounted on the wings for vertical lift and landing. One problem with loading cargo onto a VTOL and other types of UAVs is that the wings and/or rotors can make it difficult to access the hatch for loading and unloading cargo.

SUMMARY

Embodiments described herein provide for a UAV with enhanced cargo storage. The UAV is equipped with a removable and interchangeable cargo pod that forms a section of the fuselage. The pod is detachable from the UAV via a quick release mechanism and rails to improve accessibility for loading cargo and to enable interchangeability of pods on the UAV. The configuration allows pods to be prepared and loaded with cargo before a UAV arrives to efficiently load the UAV upon its landing. Additionally, the detachability of the pod as a secondary structure of the aircraft allows the pod to be designed to maximize cargo volume and to reduce its load bearing capability (thus reducing cost to manufacture) since most of the load may be carried through the main airframe of the UAV.

One embodiment is a cargo pod for an unmanned aerial vehicle (UAV). The cargo pod includes a hollow body that forms a section of a fuselage of the UAV, and further includes a latching mechanism of the hollow body that releasably secures the hollow body with the fuselage of the UAV.

Another embodiment is an unmanned aerial vehicle (UAV). The UAV includes wings and a fuselage. The fuselage includes a mainframe portion to support the wings, and a cargo pod portion that is detachable from the mainframe portion.

Yet another embodiment is a method. The method includes loading cargo into a first cargo pod that is uncoupled to an unmanned aerial vehicle (UAV), landing the UAV, detaching a second cargo pod forming a portion of a fuselage of the UAV from the UAV, and coupling the first cargo pod to the UAV to form the portion of the fuselage.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1A:
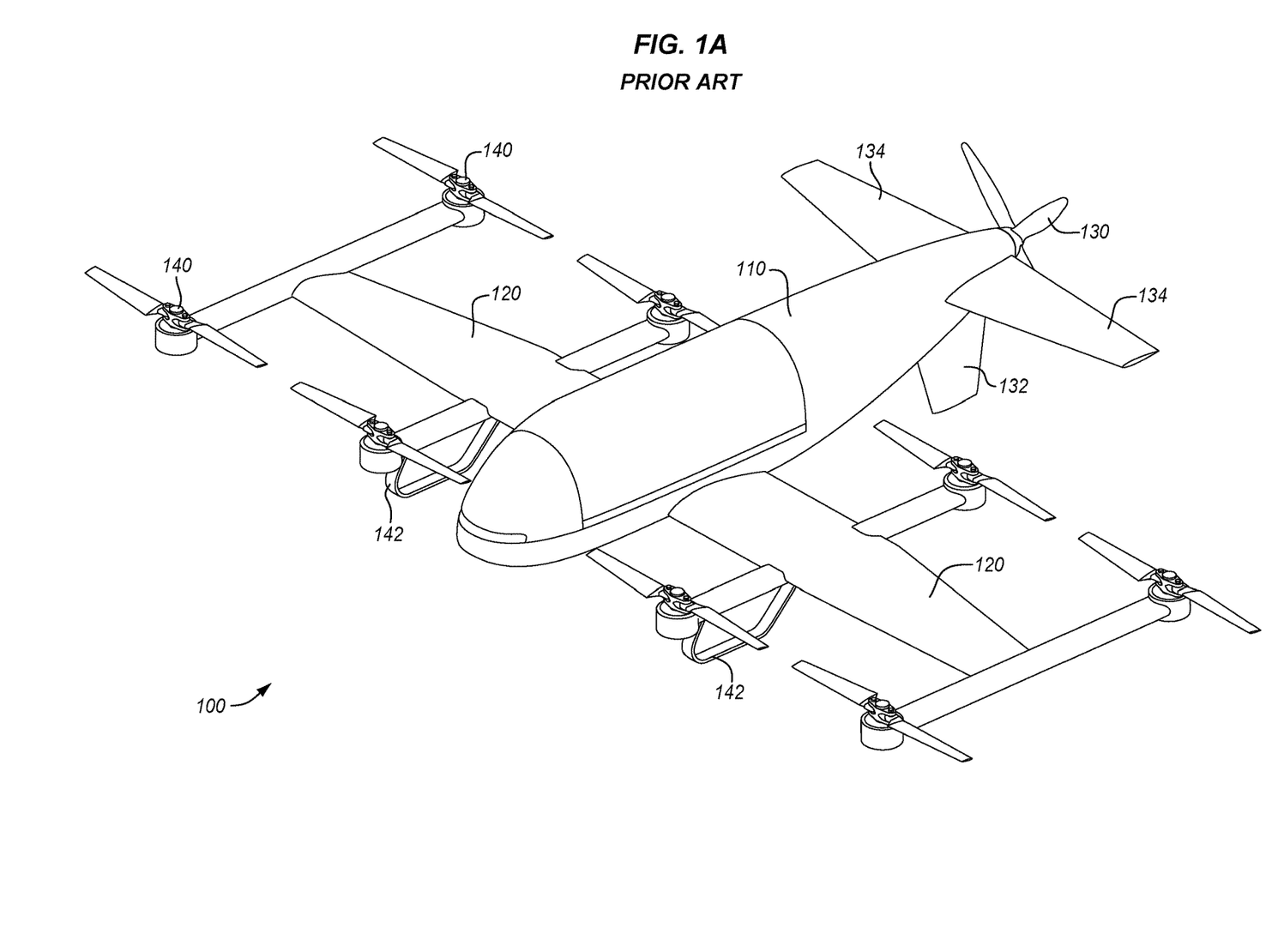
FIG. 1A is a perspective view of an unmanned aerial vehicle (UAV).

FIG. 1A is a perspective view of an unmanned aerial vehicle (UAV) 100. The structure of the UAV 100 is merely provided as an example, and the concepts described herein may apply to alternative UAVs and aircrafts. In this example, the UAV 100 includes a fuselage 110, and wings 120 extending from opposite sides of fuselage 110 to define a support plane for horizontal or wing-borne flight. The UAV 100 also includes a propeller 130 that provides thrust for wing-borne flight, although other types of engines may be used to generate thrust. The tail of the UAV 100 may further include a rudder 132 and/or elevators 134 for flight control.

To provide vertical flight (i.e., take-off, hover, and landing), the UAV 100 may include one or more rotors 140 that spin via a motor to provide vertical lift. In the example of FIG. 1A, multiple rotors 140 are mounted on each of the wings 120. However, the particular number and location may vary, and the concepts described herein may apply to UAV configurations with a single rotor, stopped rotor, tilt rotor, etc. In some embodiments, the rotors 140 may fold into a stowed position for horizontal flight or after landing the UAV 100. The UAV 100 may also include landing supports 142 underneath the wings 120 to stabilize the UAV 100 on the ground.

Figure 1B:
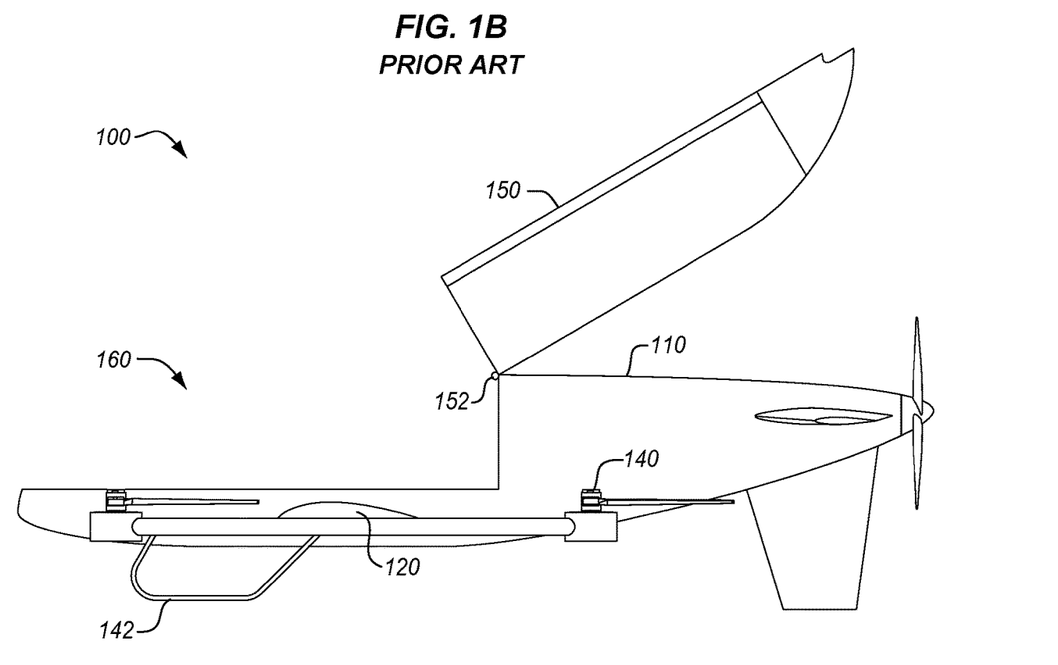
FIG. 1B is a side view of the UAV.
Figure 1C:
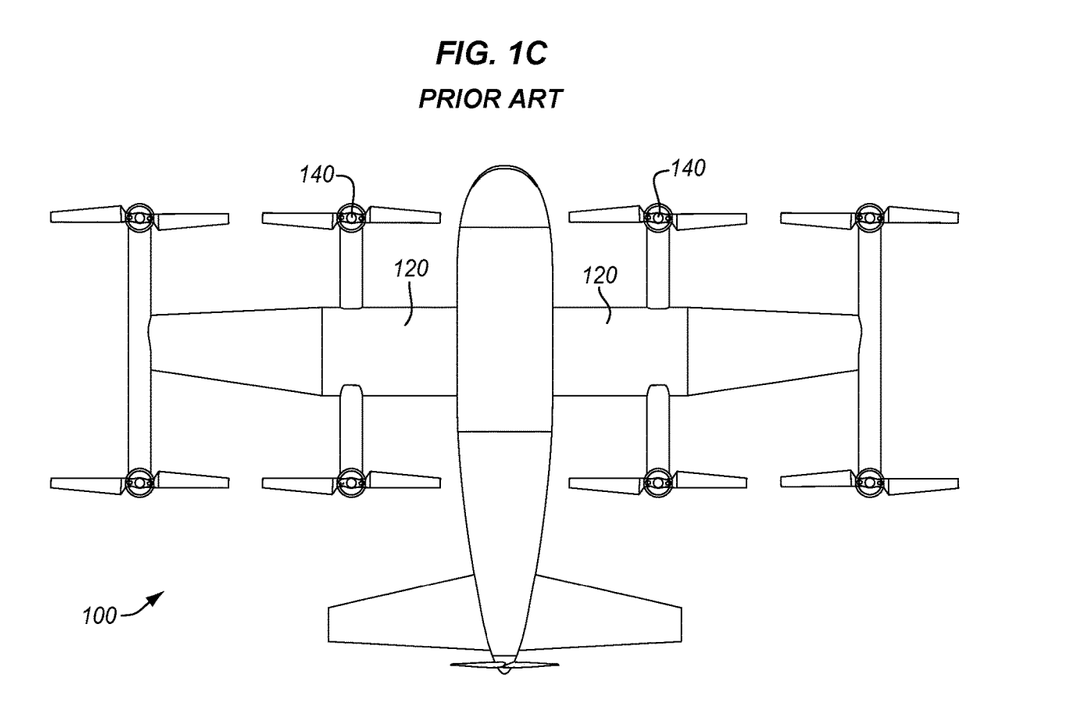
FIG. 1C is a top view of the UAV.

FIG. 1B is a side view of the UAV 100. As shown in FIG. 1B, the UAV 100 may include a door 150 and hinge 152 for loading and unloading a cargo area 160 of the UAV 100. FIG. 1C is a top view of the UAV 100. As shown in FIG. 1C, the structure of the wings 120 and/or the rotors 140 of the UAV 100 may leave little room for accessing the cargo area 160. Therefore, workers or machinery that lift cargo into or out of the cargo area 160 may encounter difficulties in loading or unloading heavy objects to the UAV 100.

Figure 2A:
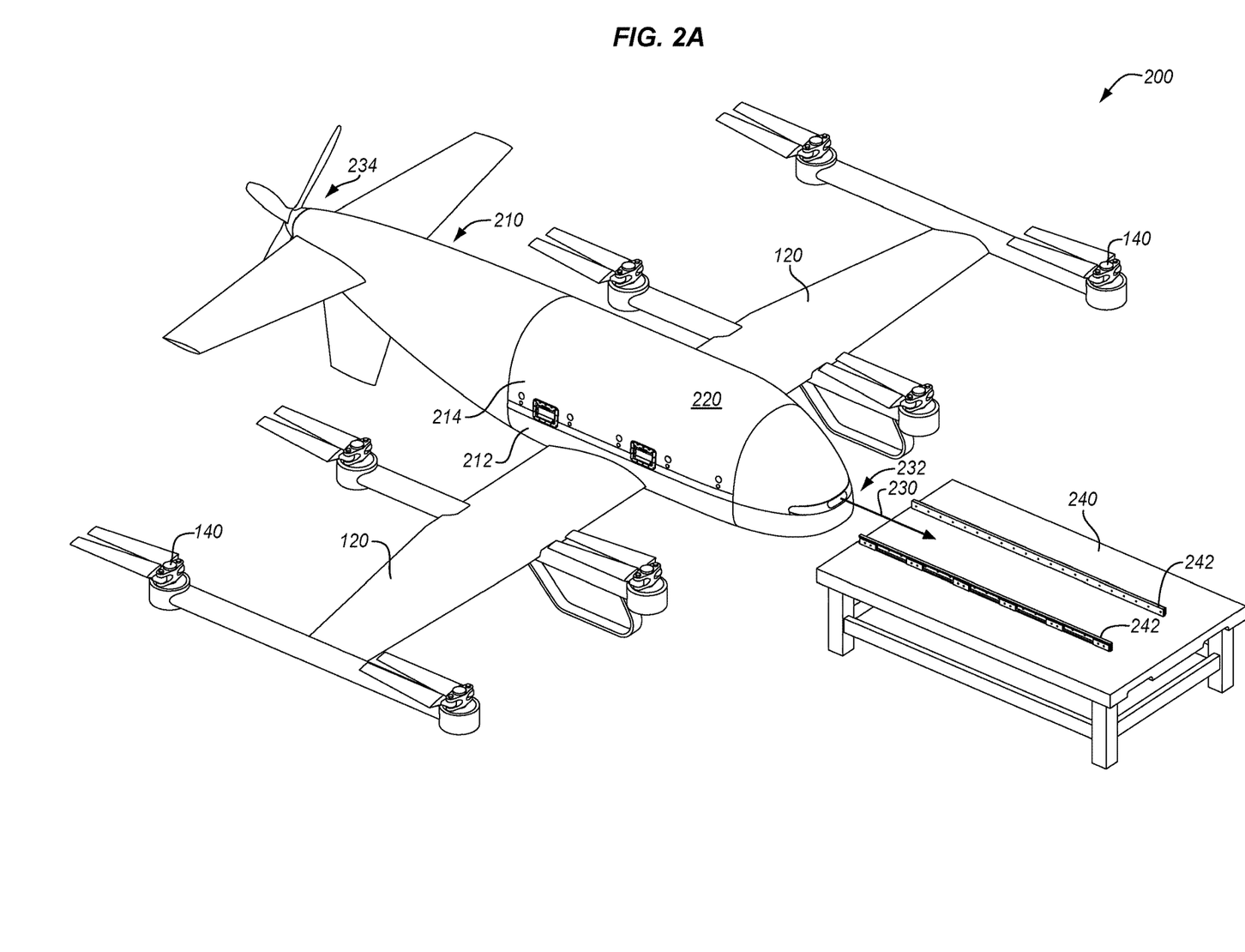
FIG. 2A is a perspective view of a UAV enhanced with a detachable cargo pod in an illustrative embodiment.

To improve cargo loading and unloading, a UAV may be enhanced with a detachable cargo pod. FIG. 2A is a perspective view of a UAV 200 enhanced with a detachable cargo pod 220 in an illustrative embodiment. When attached to the UAV 200, the cargo pod 220 generally forms a section or portion of the fuselage 210 of the UAV 200. That is, the fuselage 210 includes a mainframe portion 212 to support the wings 120 and carry the flight load, and a cargo pod portion 214 where the cargo pod 220 fits. Together, the mainframe portion 212 and the cargo pod portion 214 form the shape of the fuselage 210. In other words, the cargo pod 220 may include an outer surface, profile, or shape that forms to the outer surface of the fuselage 210.

The cargo pod portion 214, including the cargo pod 220, may be detached from the mainframe portion 212 of the fuselage 210. That is, the cargo pod 220 may be slidably detachable from the mainframe portion 212 of the fuselage 210 in a longitudinal direction 230 toward a front or nose 232 of the UAV 200. The longitudinal direction 230 generally extends from the tail 234 toward the nose 232 of the UAV 200. To accommodate loading and unloading of the UAV 200, a platform 240 may be provided adjacent or proximate to the nose 232. As described in greater detail below, the platform 240 may include one or more tracks 242 to slide the cargo pod 220 on and off the UAV 200.

Figure 2B:
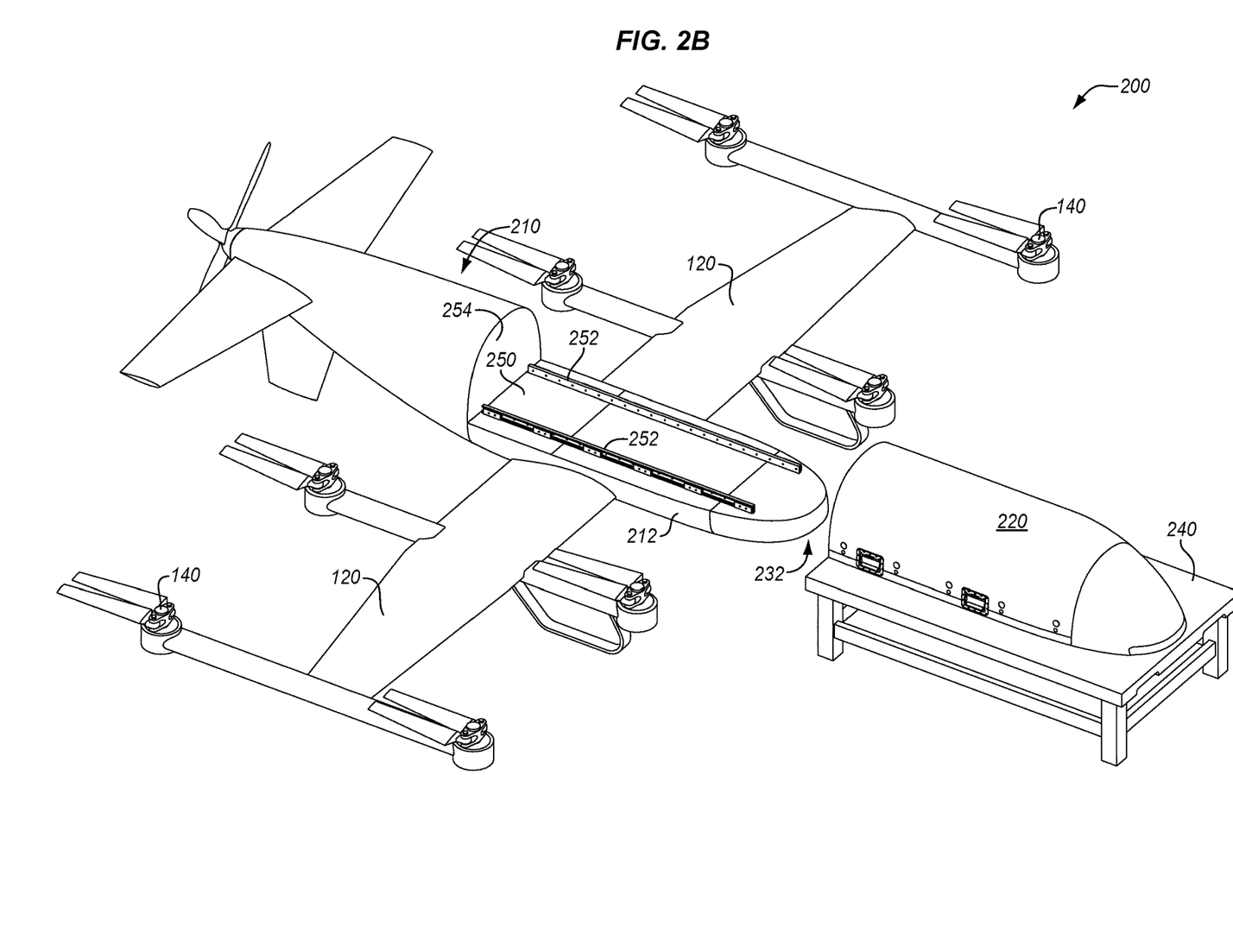
FIG. 2B is a perspective view of the cargo pod detached from the UAV in an illustrative embodiment.

FIG. 2B is a perspective view of the cargo pod 220 detached from the UAV 200 in an illustrative embodiment. With the cargo pod 220 detached from the UAV 200, the mainframe portion 212 is exposed at a top surface 250 and a back wall 254. The top surface 250 of the mainframe portion 212 supports the cargo pod 220 when the cargo pod 220 is attached. The top surface 250 may be a substantially flat surface in a horizontal plane that extends in the longitudinal direction 230 between the back wall 254 and the nose 232. The back wall 254 of the mainframe portion 212 extends in a vertical plane from the top surface 250 to an outer perimeter of the fuselage 210. Additionally, the top surface 250 may include tracks 252 to slide the cargo pod 220 on and off the UAV 200.

Generally, the top surface 250 and the back wall 254 of the mainframe portion 212 are sized to correspond with the dimensions and shape of the cargo pod 220. For embodiments of the UAV 200 in which increased cargo carrying capacity is desired (i.e., to accommodate large versions of the cargo pod 220), the top surface 250 may extend between the nose 232 and a location behind or beyond the wings 120 in the longitudinal direction 230. For instance, the top surface 250 (and the cargo pod 220) may extend through the fuselage 210 along the longitudinal direction 230 for more than half the overall length of the fuselage 210.

Figure 2C:
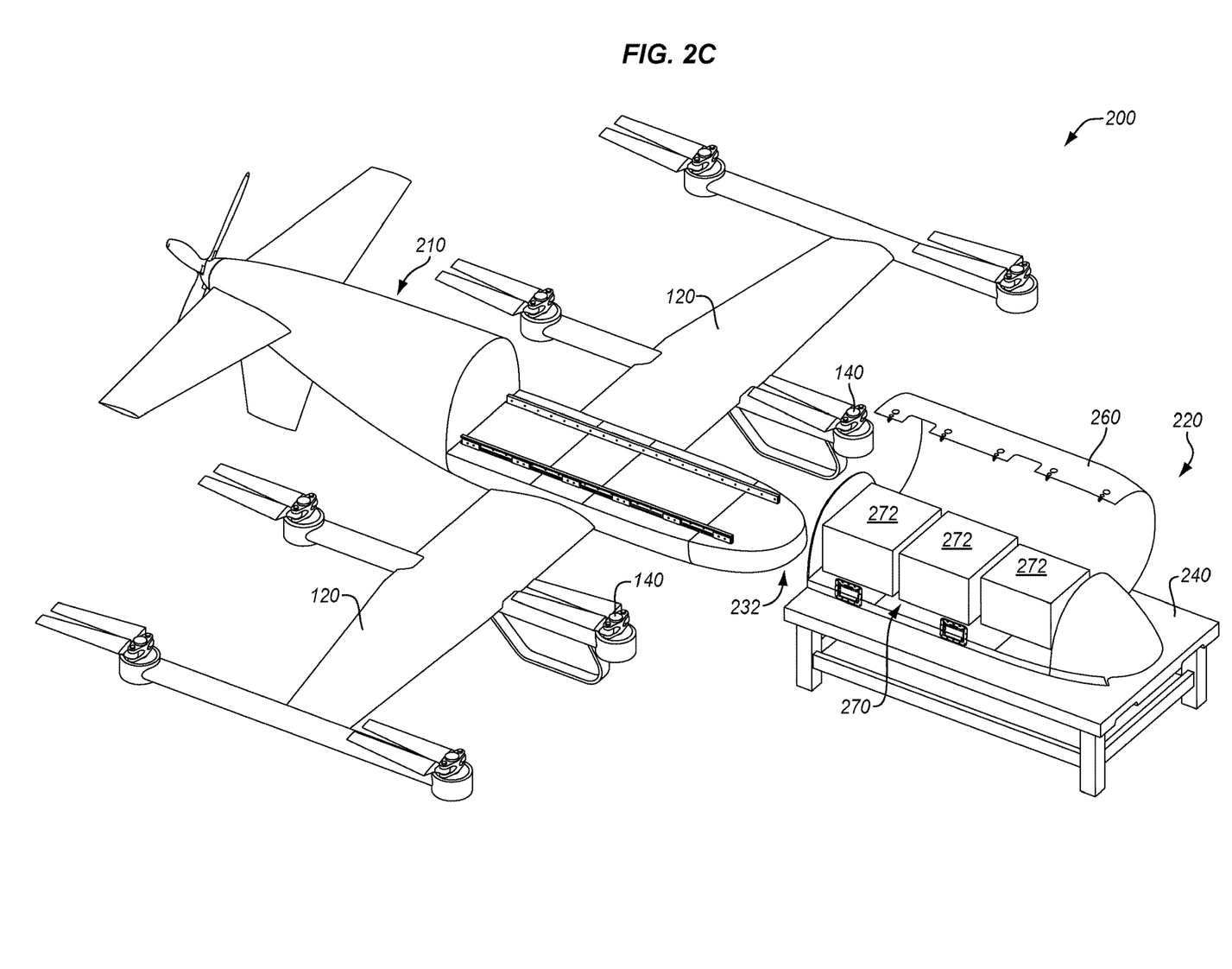
FIG. 2C is a perspective view of the cargo pod detached from the UAV and opened for accessing cargo in an illustrative embodiment.

FIG. 2C is a perspective view of the cargo pod 220 detached from the UAV 200 and opened for accessing cargo in an illustrative embodiment. As shown in FIG. 2C, the cargo pod 220 includes a hollow body 270 to house one or more cargo items 272, and a door 260 on the hollow body 270 that opens and closes for securing and accessing the cargo items 272 in the hollow body 270. As alluded to above, the hollow body 270 may be a longitudinal body with dimensions corresponding to the top surface 250 and the back wall 254 of the mainframe portion 212. As shown in FIG. 2C, the door 260 may be a clamshell door that opens and closes across the longitudinal body and over the cargo items 272. With the door 260 closed and the cargo pod 220 secured to the UAV 200, the hollow body 270 and the door 260 form an aerodynamic shape that defines an outer mold line of the fuselage 210.

Moreover, as shown in FIG. 2C, the detachability of the cargo pod 220 enables the cargo items 272 to be easily accessed for loading and unloading at a distance or area unobstructed by the structure of the UAV 200, such as the wings 120, rotors 140, and portions of the fuselage 210. The cargo pod 220 thus provides a technical benefit by facilitating workers or machinery to load and unload the cargo items 272 for the UAV 200 in an unrestricted space. Additionally, when attached or reattached to the UAV 200, the cargo pod 220 forms a cohesive outer surface with the fuselage 210 for unaffected flight aerodynamics.

Figure 3A:
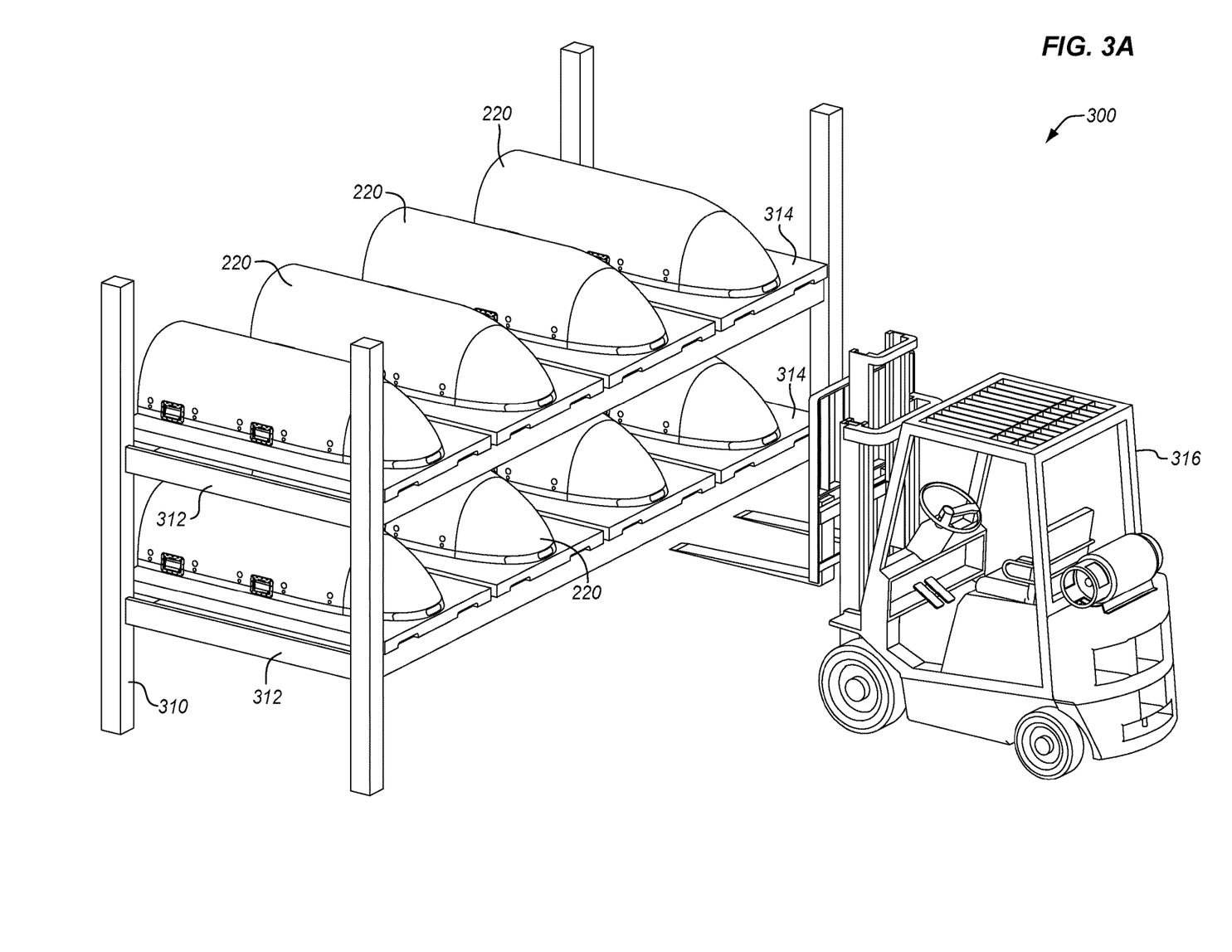
FIG. 3A illustrates a warehouse environment for cargo pods in an illustrative embodiment.

FIG. 3A illustrates a warehouse environment 300 for cargo pods 220 in an illustrative embodiment. As shown in FIG. 3A, a storage rack 310 having one or more shelves 312 supports and stores multiple cargo pods 220. The cargo pods 220 may have identical or similar sizes and features to enable interchangeability of the cargo pods 220 on the UAV 200. Therefore, the cargo pods 220 may be prepared and loaded with cargo before a UAV arrives to efficiently load the UAV 200 after the UAV 200 lands. Additionally, each cargo pod 220 may be placed on a loading bed 314 for maneuvering the cargo pods 220 between the storage rack 310 and the UAV 200. Machinery, such as a forklift 316, may be used to lift and maneuver the loading bed 314 supporting a cargo pod 220.

Figure 3B:
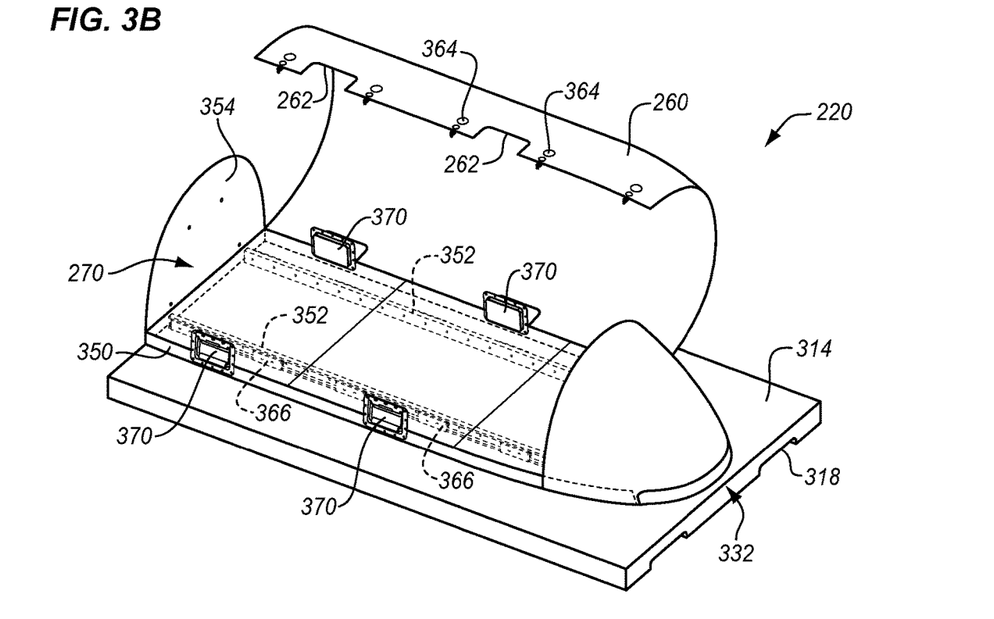
FIG. 3B is a perspective view of the cargo pod in an illustrative embodiment.
Figure 3C:
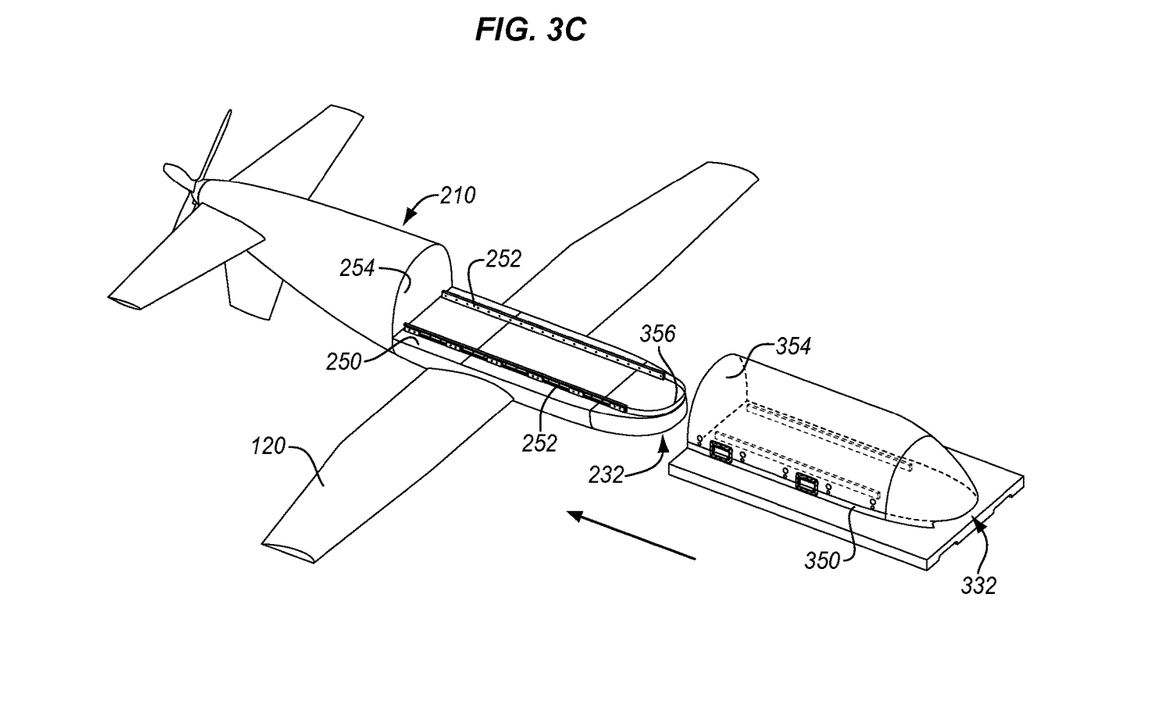
FIG. 3C is a perspective view of the cargo pod attaching to the UAV in an illustrative embodiment.

FIG. 3B is a perspective view of the cargo pod 220 in an illustrative embodiment. FIG. 3C is a perspective view of the cargo pod 220 attaching to the UAV 200 in an illustrative embodiment. As shown in FIGS. 3B and 3C, the hollow body 270 may be defined by a back end 354, a bottom surface 350, the door 260, and/or a nose portion 332. The back end 354 and the bottom surface 350 of the cargo pod 220 may contact, align, and generally correspond with the back wall 254 and the top surface 250 of the UAV 200, respectively.

The cargo pod 220 may further include rails 352 in the bottom surface 350 (as denoted by dashed lines) to correspond and slidably join with the tracks 252 on the top surface 250 of the UAV 200. The tracks 252 may include a leading end 356 that is rounded or tapered to facilitate alignment of the rails 352 and the tracks 252. The leading end 356 may curve at, along, or near the nose 232 to connect the tracks 252 and advantageously facilitate centering of the cargo pod 220 on the UAV 200 for reduced alignment precision for joining the cargo pod 220. The configuration of the tracks 252 and the rails 352 as shown and described herein are examples, and alternative sliding mechanism arrangements and components are possible, including the rails 352 on the UAV 200 and the tracks 252 on the cargo pod 220, and/or one or more grooves, ball bearings, lock/release mechanisms, etc. In one embodiment, the tracks 252 and the rails 352 may be slidably joined with end stops such that the cargo pod 220 may slide forward from the nose 232 for increased access space from the structure of the UAV 200 without separating entirely from the UAV 200.

As shown in FIG. 3B, the cargo pod 220 may additionally include one or more handles 370 along a side or outer perimeter of the hollow body 270 to facilitate lifting, sliding, or otherwise maneuvering of the cargo pod 220. The door 260 may include handle cutouts 262 to enable access to the handles 370 when the door 260 is closed. The door 260 may further include a hinge (not shown) that rotatably joins the door 260 to one side of the hollow body 270, and one or more levers 364 or latches to align and lock with locking interfaces 366 on the other side of the hollow body 270 to releasably secure cargo stored in the cargo pod 220. Further, the loading bed 314 may include a sliding device or mechanism (e.g., similar to the tracks 242 of the platform 240 shown and described for FIG. 2A) to slidably join the cargo pod 220 and facilitate guiding and sliding of the cargo pod 220 to install and remove of the cargo pod 220 with respect to the UAV 200. The loading bed 314 may also include indentations 318 or grooves in its bottom surface to facilitate securely moving the loading bed 314 and the cargo pod 220 with an arm of the forklift 316.

As shown in FIGS. 3A-3C, the cargo pods 220 are swappable on the UAV 200 to advantageously enable loading of cargo in parallel and in the absence of the UAV 200 to increase loading efficiency, reduce aircraft ground time, and maximize utilization of the UAV 200 for flight missions. Additionally, the structure of the UAV 200 enables the load to be carried by the main frame of the UAV 200 that is separate from the cargo pod 220. Accordingly, the structure of the cargo pod 220, including the bottom surface 350, may be designed to minimize loading bearing structure to maximize volume space for cargo secured in the cargo pod 220. Furthermore, the cargo pod 220 is shaped as a portion of the outer mold line of the fuselage 210 to provide a further technical benefit in maximizing cargo volume on the UAV 200.

Figure 4A:
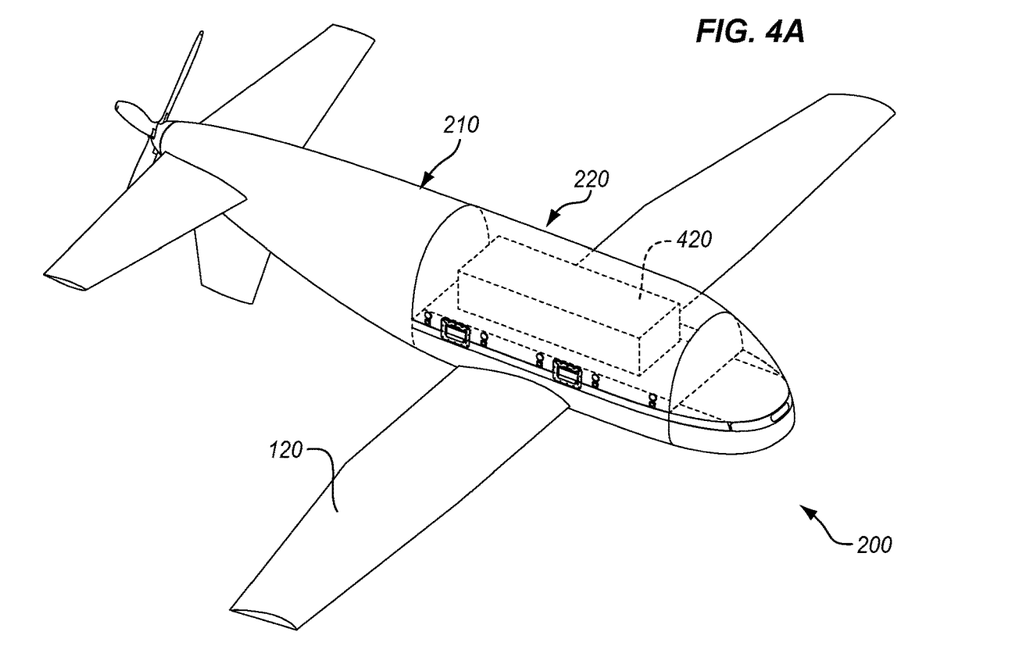
FIG. 4A is a perspective view of a cargo pod with a battery and attached to the UAV in an illustrative embodiment.

FIG. 4A is a perspective view of the cargo pod 220 with a battery 420 and attached to the UAV 200 in an illustrative embodiment. The cargo pod 220 may include the battery 420 as a separate or an integrated component of the cargo pod 220. The battery 420 may reduce or eliminate space inside the cargo pod 220 for carrying other cargo items. Electrical interfaces of the battery 420 at the bottom surface 350 and/or back end 354 may align/connect with electrical interfaces at the top surface 250 and/or back wall 254 to connect the battery 420 with for other electrical components of the UAV 200. Accordingly, cargo pods 220 with the battery 420 may be swapped onto the UAV 200 to increase flight range capability of the UAV 200. Therefore, the cargo pods 220 provide yet another technical benefit for the UAV 200 by enabling the capability of the UAV 200 to be tailored to missions and a desired balance of cargo payload volume capacity versus flight range capability.

Figure 4B:
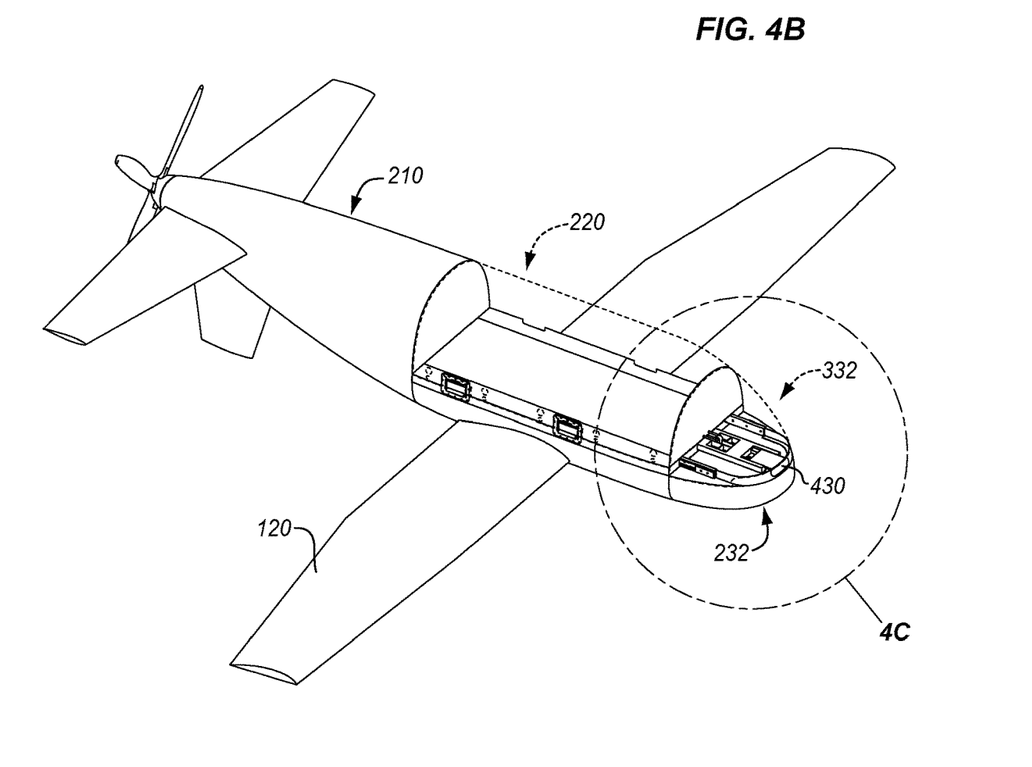
FIG. 4B is a perspective view of the cargo pod with a release button and attached to the UAV in an illustrative embodiment.

FIG. 4B is a perspective view of the cargo pod 220 with a release button 430 and attached to the UAV 200 in an illustrative embodiment. With the cargo pod 220 slid onto and down the length of the tracks 252, the nose portion 332 of the cargo pod 220 forms at least part of the nose 232 of the UAV 200. When the cargo pod 220 is properly installed on the UAV 200, the nose 232 generally may define a front portion of the fuselage 210 which tapers and/or rounds to a front tip of the UAV 200. The release button 430 may be located at or near a front tip of the UAV 200 or at or near a front of the nose portion 332 and/or the nose 232.

Figure 4C:
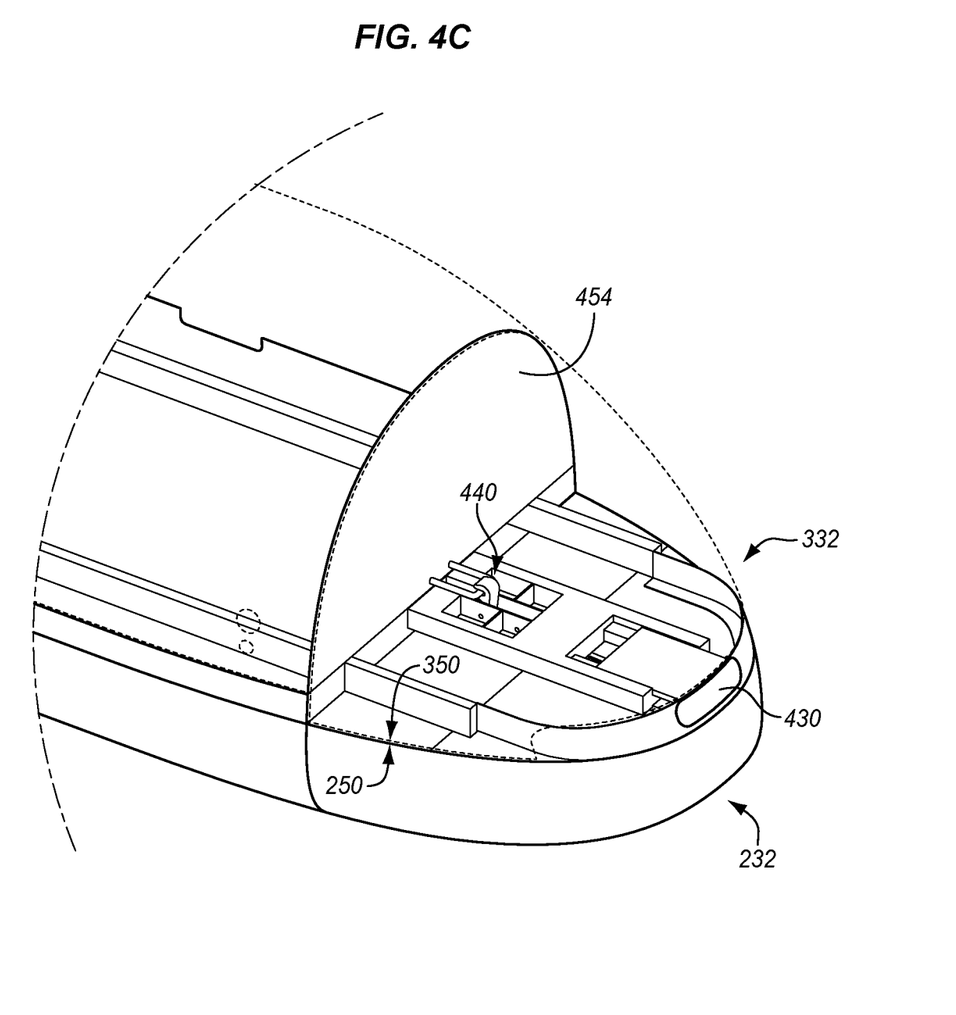
FIG. 4C is a close-up perspective view of a nose portion of the cargo pod having a release button and latch in an illustrative embodiment.

FIG. 4C is a close-up perspective view of the nose portion 332 of the cargo pod 220 having the release button 430 and a latch 440 in an illustrative embodiment. The latch 440 is any latching device or mechanism to releasably secure the cargo pod 220 with the UAV 200. As described in greater detail below, the latch 440 is mechanically coupled with the release button 430 and unlocks in response to a pressing of the release button 430. In a locked position, components of the latch 440 may connect at or near an interface between the top surface 250 of the UAV 200 and a bottom surface 350 of the cargo pod 220 at the nose portion 332. The nose portion 332 may include a rear nose wall 454 that separates or defines a boundary between the nose portion 332 and the hollow body 270 of the cargo pod 220 for carrying cargo. The rear nose wall 454 may extend in a vertical plane from the bottom surface 350 to an outer perimeter of the nose 232 or fuselage 210. The latch 440 may be centered in a width of the nose portion 332. Alternatively or additionally, the latch 440 may be disposed at alternative locations and/or include multiple latching devices or components to releasably secure the cargo pod 220 with the UAV 200.

Figure 5A:
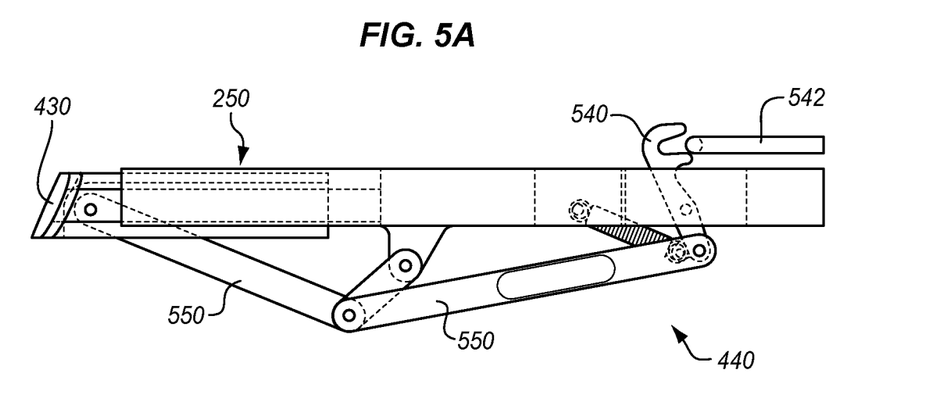
FIG. 5A is a side view of the latch in a locked position in an illustrative embodiment.
Figure 5B:
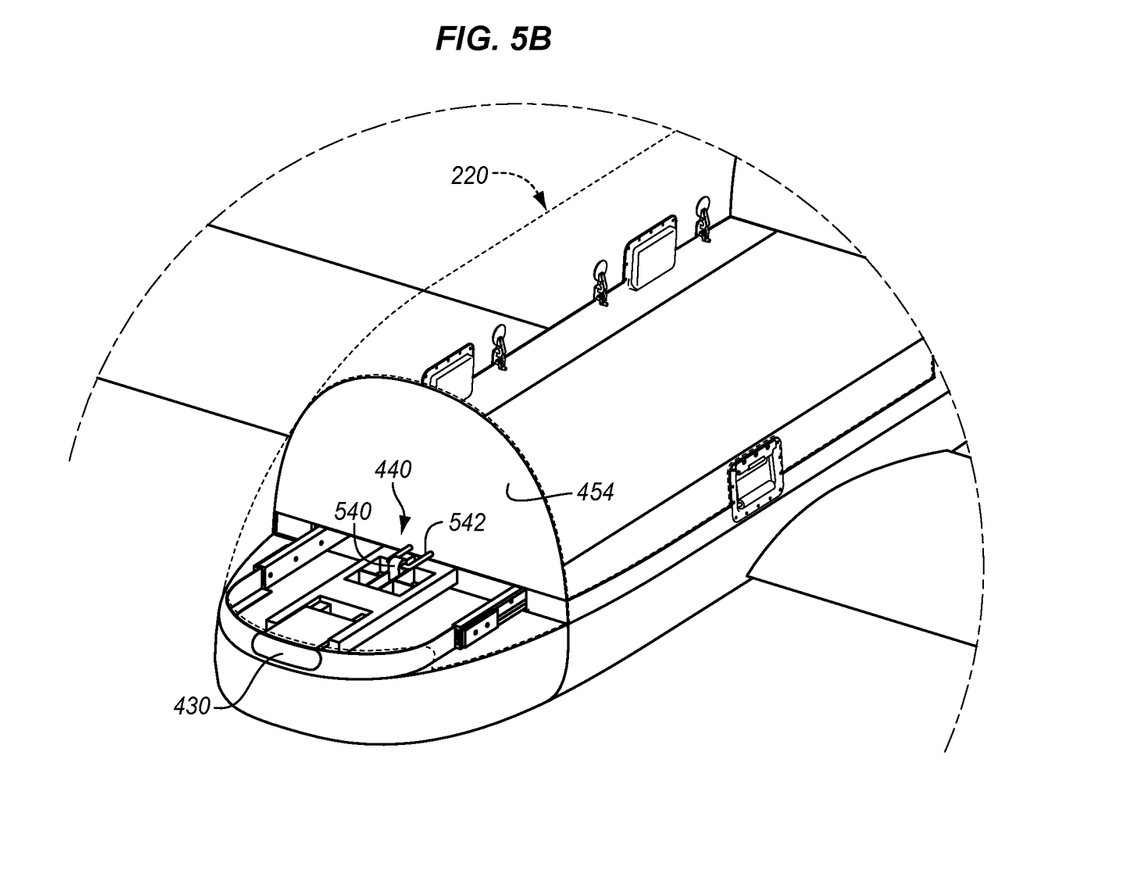
FIG. 5B is a perspective view of the latch engaged to secure the cargo pod with the UAV in an illustrative embodiment.

FIG. 5A is a side view of the latch 440 in a locked position in an illustrative embodiment. In this example, the latch 440 includes a latch hook 540 that is mechanically coupled with the release button 430 via one or more levered arms 550, joints, springs, etc. underneath of the top surface 250 of the UAV 200. In the locked position, the latch hook 540 protrudes above the top surface 250 to engage the cargo pod 220. FIG. 5B is a perspective view of the latch 440 engaged to secure the cargo pod 220 with the UAV 200 in an illustrative embodiment. In particular, the latch hook 540 engages with a latch bar 542 that is mounted to the rear nose wall 454 of the cargo pod 220.

Figure 6A:
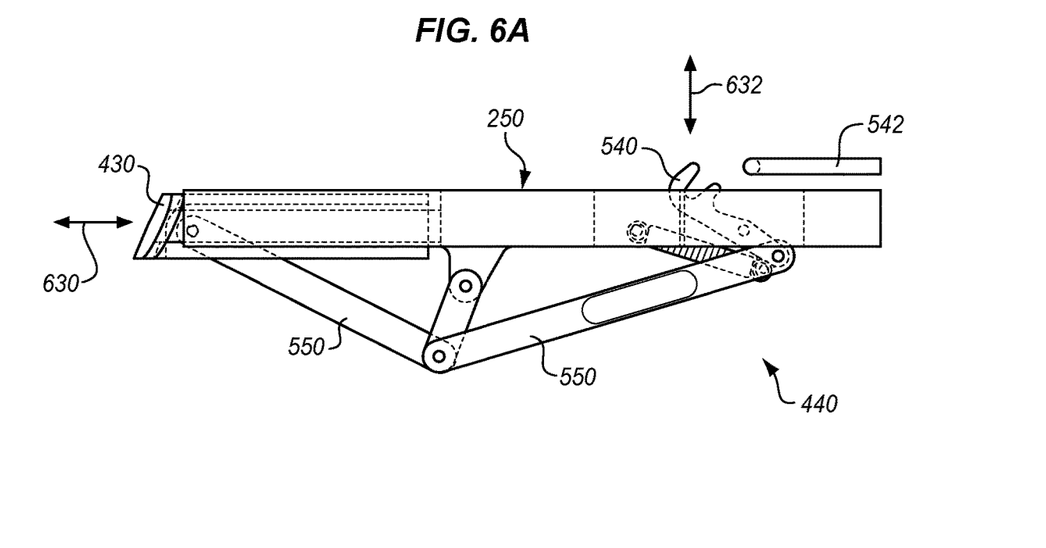
FIG. 6A is a side view of the latch in an unlocked position in an illustrative embodiment.
Figure 6B:
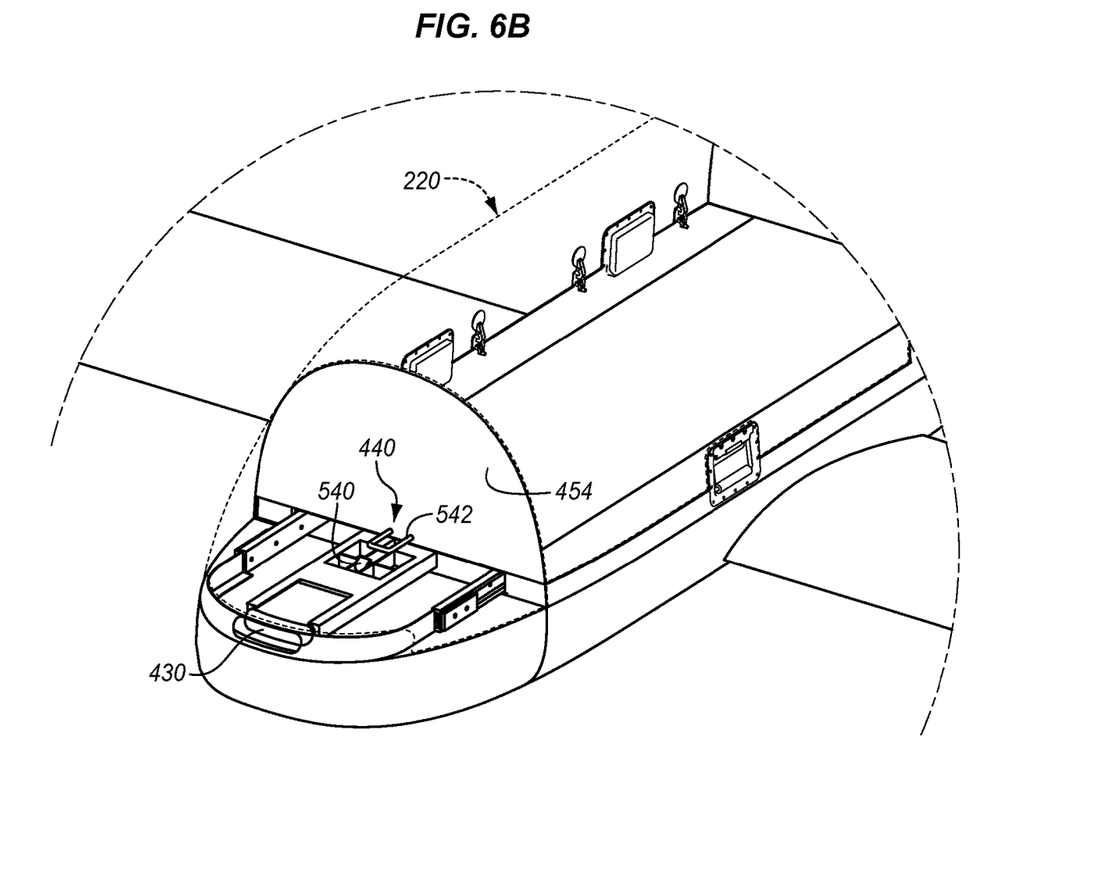
FIG. 6B is a perspective view of the latch disengaged to release the cargo pod from the UAV in an illustrative embodiment.

FIG. 6A is a side view of the latch 440 in an unlocked position in an illustrative embodiment. To disengage or unlock the latch 440, an actuation 630 of the release button 430 (e.g., inward horizontal press) imparts a retraction 632 of the latch hook 540 toward and/or into the top surface 250 via the more levered arms 550, joints, springs, etc. FIG. 6B is a perspective view of the latch 440 disengaged to release the cargo pod 220 from the UAV 200 in an illustrative embodiment. With the actuation 630 of the release button 430, the latch hook 540 is retracted and/or rotated way from the latch bar 542 mounted to the rear nose wall 454 of the cargo pod 220. Moreover, the latch hook 540 withdraws to a position that is flush or underneath the top surface 250 for unobstructed disengagement and sliding of the cargo pod 220 toward the front of the UAV 200. Accordingly, the latch 440 provides a technical benefit in providing a quick release mechanism and quick connect mechanism for the cargo pod 220 and the UAV 200.

Figure 7:
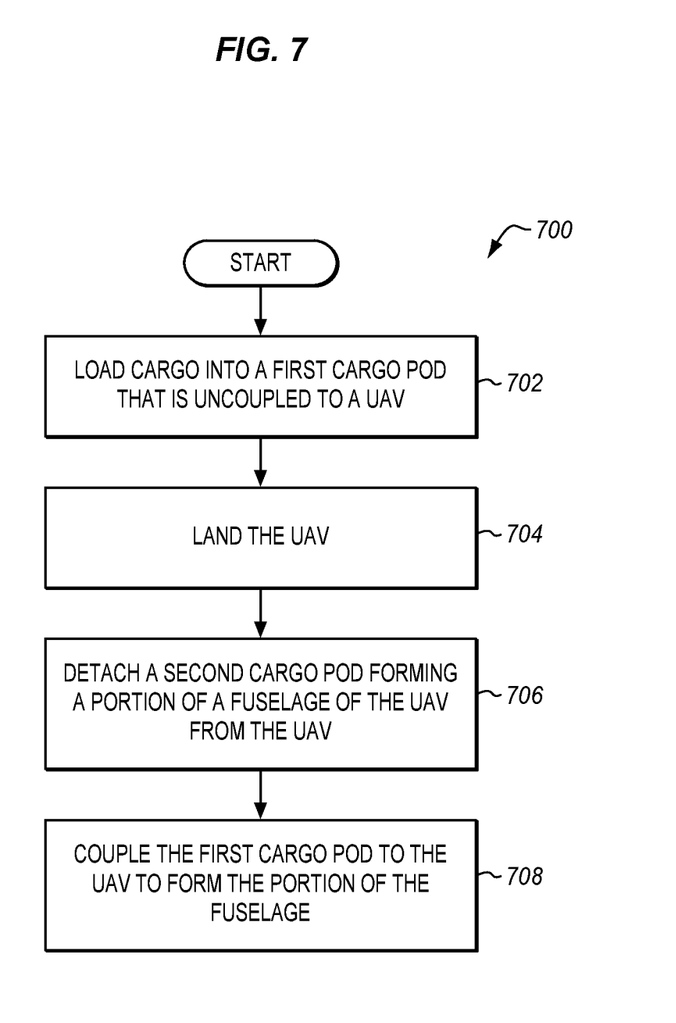
FIG. 7 is a flowchart illustrating a method for loading cargo onto the UAV in an illustrative embodiment.

FIG. 7 is a flowchart illustrating a method 700 for loading cargo onto the UAV in an illustrative embodiment. The steps of the method 700 are described with reference to the UAV 200, but those skilled in the art will appreciate that the method 700 may be performed for other aircrafts. The steps of the flowcharts described herein are not all inclusive and may include other steps not shown. The steps described herein may also be performed in an alternative order.

In step 702, cargo is loaded into a first cargo pod 220 that is uncoupled to the UAV 200. In step 704, the UAV 200 lands. In step 706, a second cargo pod 220 which forms a portion of the fuselage 210 is detached from the UAV 200.

In step 708, the first cargo pod 220 is coupled to the UAV 200 to form the portion of the fuselage 210. In one embodiment, the first cargo pod 220 is coupled to the UAV 200 via the platform 240 or the loading bed 314 which slidably supports the first cargo pod 220 prior to coupling. The coupling of the first cargo pod 220 may be performed by aligning the tracks 242 of the platform 240 or the loading bed 314 with the tracks 252 of the UAV 200, and sliding the first cargo pod 220 from the platform 240 or the loading bed 314 onto the UAV 200. In another embodiment, the second cargo pod 220 may be detached from the UAV 200 via a quick release mechanism, and the first cargo pod 220 may be attached to the UAV 200 via a quick connect mechanism.

Although specific embodiments were described herein, the scope is not limited to those specific embodiments. Rather, the scope is defined by the following claims and any equivalents thereof

What is claimed is:

1. A method comprising:
   loading cargo into a first cargo pod that is uncoupled to an unmanned aerial vehicle (UAV);
   landing the UAV;
   detaching a second cargo pod forming at least a top portion of a nose of a fuselage of the UAV from the UAV, wherein the nose is disposed in a forward direction with respect to the fuselage, and wherein the detaching includes sliding the second cargo pod in the forward direction from the fuselage via a sliding mechanism on the UAV; and
   coupling the first cargo pod to the UAV to form at least the top portion of the nose of the fuselage, wherein the coupling includes sliding the first cargo pod in a back direction opposite to the forward direction via the sliding mechanism on the UAV.

2. The method of claim 1 further comprising:
   coupling the first cargo pod via a platform supporting the first cargo pod.

3. The method of claim 2 wherein:
   the platform includes a first track configured to interconnect with a rail of the first cargo pod; and
   the UAV includes a second track configured to interconnect with the rail of the first cargo pod.

4. The method of claim 3 further comprising:
   coupling the first cargo pod by:
      aligning the first track of the platform with the second track of the UAV; and
      sliding the first cargo pod from the platform onto the UAV.

5. The method of claim 1 further comprising:
   detaching the second cargo pod via a quick release mechanism.

6. The method of claim 1 further comprising:
   coupling the first cargo pod via a quick connect mechanism.

7. The method of claim 1 further comprising:
   detaching the second cargo pod via a release button, wherein the release button is disposed at a nose tip of the second cargo pod.

8. The method of claim 7 further comprising:
   pressing the release button to disengage a latch hook from a latch bar, wherein the latch hook withdraws below a top surface of the UAV for unobstructed sliding of the second cargo pod over the top surface of the UAV.

9. The method of claim 8 wherein:
   the latch bar is mounted to a rear nose wall of the second cargo pod.

10. The method of claim 1 wherein:
    the first cargo pod forms a portion of the fuselage extending from a tip of the nose to a position behind wings of the UAV.

11. The method of claim 1 wherein:
    the second cargo pod forms a portion of the fuselage extending from a tip of the nose to a position behind wings of the UAV.

12. The method of claim 1 wherein:
    the sliding mechanism is disposed on a flat top surface of the UAV, the flat top surface sized to correspond with a flat bottom surface of the first cargo pod.

13. The method of claim 1 wherein:
    the sliding mechanism is disposed on a flat top surface of the UAV, the flat top surface sized to correspond with a flat bottom surface of the second cargo pod.

14. The method of claim 1 further comprising:
    coupling the first cargo pod includes connecting a battery disposed in the first cargo pod with an electrical interface of the UAV.

15. The method of claim 1 wherein:
    the second cargo pod includes a nose portion that houses a latching mechanism to releasably secure the second cargo pod with the UAV, and
    the second cargo pod includes a hollow body portion to house cargo, the hollow body portion separated from the nose portion by a wall.

16. The method of claim 1 wherein:
    the first cargo pod includes a nose portion that houses a latching mechanism to releasably secure the first cargo pod with the UAV, and
    the first cargo pod includes a hollow body portion to house cargo, the hollow body portion separated from the nose portion by a wall.

17. The method of claim 1 wherein:
    the second cargo pod includes a clamshell door that opens and closes a body of the second cargo pod.

18. The method of claim 17 wherein:
    the clamshell door forms an aerodynamic shape that defines an outer mold line of the fuselage.

19. The method of claim 1 wherein:
    the first cargo pod includes a clamshell door that opens and closes a body of the first cargo pod.

20. The method of claim 19 wherein:
    the clamshell door forms an aerodynamic shape that defines an outer mold line of the fuselage.

* * * * *